United States Patent

Rottmiller

[15] 3,673,932
[45] July 4, 1972

[54] IMAGE COMBINING OPTICAL SYSTEM

[72] Inventor: Edmund H. Rottmiller, San Diego, Calif.
[73] Assignee: Stromberg Datagraphix, Inc., San Diego, Calif.
[22] Filed: Aug. 3, 1970
[21] Appl. No.: 60,225

[52] U.S. Cl. ...............95/1.1, 95/12, 353/37, 353/81, 355/43, 355/65, 355/66
[51] Int. Cl. ..............G03b 15/10
[58] Field of Search ............95/1.1, 12; 355/40, 43, 51, 355/65, 66; 353/81, 37

[56] References Cited

UNITED STATES PATENTS 3,495,267  2/1970  Brodie ..................95/1.1 X

Primary Examiner—Samuel S. Matthews
Assistant Examiner—Richard A. Wintercorn
Attorney—John R. Duncan

[57] ABSTRACT

An optical system for combining two or more images from directionally and diffusely illuminated objects is disclosed. A non-directional, diffusely illuminated light-and-shadow object, such as a cathode ray tube face is positioned, approximately parallel, to an image plane, which typically may be a display screen or a photosensitive surface. A lens system is interposed along the axis between object and image plane to focus an image of the original diffusely illuminated object onto the image plane. A very small reflector is placed at an angle to the axis between the diffusely illuminated object and the lens system. A directional source is positioned so that the light projected through a conventional transparency is reflected from the small mirror along the axis and through the lens system forming an image of the transparency on the image plane in superimposed registration with the image from the diffusely illuminated object. The mirror is sufficiently small so as to block only a very small portion of the light from the diffusely illuminated object. If desired, a plurality of small reflectors may be used with a plurality of directional sources.

8 Claims, 2 Drawing Figures

INVENTOR.
EDMUND H. ROTTMILLER
ATTORNEY

IMAGE COMBINING OPTICAL SYSTEM

BACKGROUND OF THE INVENTION

It is often desirable to superimpose light images from plural sources on a single image plane in many display and photographic applications. For example, in computer output microfilming applications the capability of simultaneously recording data from a cathode ray tube screen or face and a business form onto microfilm in superimposition is often useful. Also, in large screen display systems, it may be desirable to project a map background, a grid pattern overlay and data or radar patterns from a cathode ray tube on a display screen in superimposition.

Conventional image combining systems either project images along different, closely spaced, axes or use a beam-splitter to permit projection of plural images along one axis.

However, where separate projection axes are used, image aberrations, such as keystoning and poor image superimposition occur.

Beam-splitters use either partially reflecting or dichroic mirrors in the optical path between the plural light sources and the image plane. The beam-splitter is placed at an angle to the image plane. The sources are arranged so that light forming one image passes through the beam-splitter to the image plane while the light forming the other image is reflected to the image plane. However, since the light from each source is partially transmitted, partially reflected, and partially absorbed in metallic mirrors, less than half of the available light reaches the image plane with metallic mirror beam-splitters.

Dichroic beam-splitters are more effective where the sources emit light of different wavelengths and the light rays from each source strike the beam-splitter at a particular angle. Dichroic mirrors can be designed to transmit one wavelength range and reflect the other. However, they are less useful where both sources emit in the same wavelength ranges. Where one or both objects are in multiple colors, dichroic beam-splitters will distort the color rendition of the system.

Pellicle beam-splitters of either the metallic or beam-splitter types are fragile and susceptible to damage caused by vibration, cleaning and improper mounting. When thick beam-splitters are used aberrations are introduced since skew, sagittal and tangential components of light emission have different optical path lengths. Beam-splitters are difficult to construct to the desired degree of flatness without increasing the thickness to the point where such aberrations become virtually impossible to correct.

Thus, there is a continuing need for improved optical systems for superimposing images from a plurality of sources in register on a single image plane.

SUMMARY OF THE INVENTION

An object, therefore, of this invention is to provide an image combining optical system which overcomes the above-noted problems.

Another object of this invention is to provide an image combining optical system which utilizes a maximum amount of the available imaging light without introducing optical aberrations.

Still another object of this invention is to provide an image combining optical system of improved durability, reliability and simplicity.

The above objects, and others, are accomplished in accordance with this invention by an optical image combining system including means for forming an image of a diffusely illuminated light-and-shadow first object onto an image plane, and a small reflector positioned along this optical axis at an angle thereto, to direct light from a directionally illuminated second object into superimposed registration with the first image on the image plane.

This system permits light rays from two or more objects to pass coaxially to a single image plane, which may typically be a photosensitive sheet of film or a display screen. One or more images from directionally illuminated objects, such as conventional transparencies, may be easily combined with an image from a diffusely illuminated object, such as a cathode ray tube face. This system eliminates optical problems caused by multiple off-axis projectors without introducing the many problems inherent in the use of beam-splitters, of the partial-reflector or dichroic types.

BRIEF DESCRIPTION OF THE DRAWING

Details of the invention, and of preferred embodiments thereof, will be further understood upon reference to the drawing wherein.

DETAILED DESCRIPTION OF THE INVENTION

Figure 1:
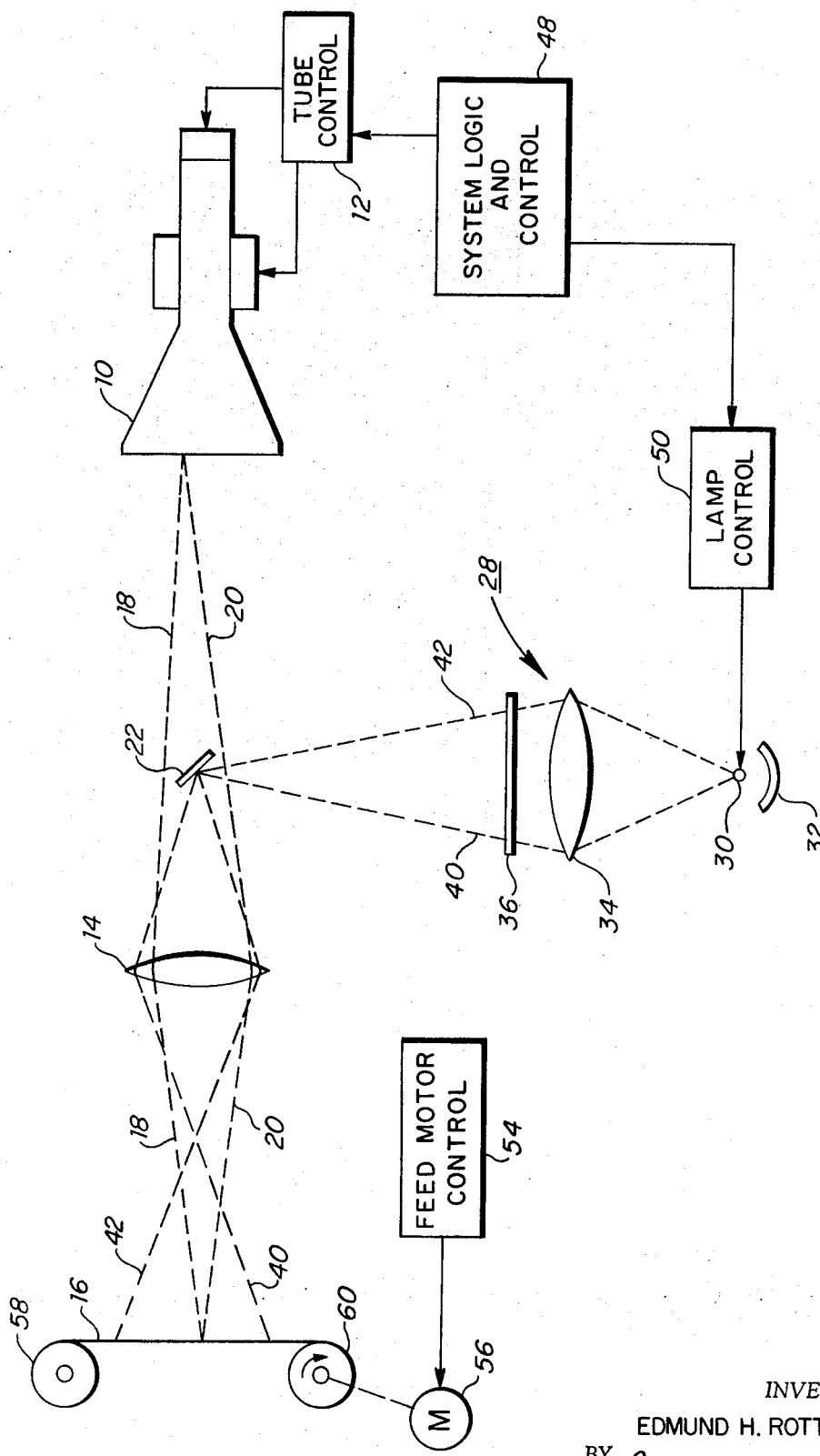
FIG. 1 shows a schematic representation of an optical system according to this invention for superimposing images.

Referring now to FIG. 1, there is seen a schematic representation of the optical system of this invention, shown in an image recording context.

A diffusely illuminated object is formed on the face of cathode ray tube 10 in a conventional manner by means of tube control system 12. Any suitable diffusely illuminated object may be used in place of tube 10, if desired. However, the optical system of this invention is especially suitable for use with cathode ray tube image sources. Light from the face of tube 10 passes through lens 14 which produces a focused image on the image plane, which in this embodiment is the surface of photographic film 16. Two typical light rays 18 and 20 are illustrated, to show the manner in which light passes around small reflector 22 between tube 10 and lens 14.

Lens 14, which is schematically illustrated, may be any suitable single to multi-element lens system.

Small mirror 22 is positioned at an angle, preferable about 45°, to the optical axis between tube 10 and film 16.

A projection system 28 is provided to direct light from a light source 30, and reflector 32, through a lens 34 to a small mirror 22 and lens 14 to film 16. Highly efficient light transmission is achieved even with a very small mirror 22 by arranging lens 34 to focus the light from source 30 to a very small spot. Information or patterns are carried by partially transparent slide 36 positioned between lens 34 and mirror 22 so that the patterns are imaged on film 16 by lens 14. Light rays 40 and 42 schematically illustrate the boundaries of the pattern area on slide 36 and of the corresponding image on film 16.

Small mirror 22 may have any suitable size and shape. It may be constructed of any suitable reflecting material. As mirror 22 is made smaller, it blocks less light from tube 10 but reflects less light from projection system 28. Conversely, as it is made larger, it favors projection system 28. Generally, it is preferred that it be made relatively small, since tube 10 tends to have a lower light output than does projection system 28. The preferred size of mirror 22 will also depend upon the size of light source 30, the magnification of the system and the spatial frequencies in slide 36. Generally, a mirror size just sufficient to reflect the significant portion of the zero order defraction pattern of slide 36 is preferred.

A preferred application of this system is in computer output microfilming. Here, tube control 12 forms alphanumeric or other information on the face of tube 10 in response to information received from a computer or tape by system logic and control means 48. Whenever an image of slide 36 is required, lamp control 50 causes light source 30 to flash. After a frame of film 16 has been exposed, feed motor controller 54 activates motor 56 to move one frame of film 16 from supply spool 58 toward take-up spool 60. Thus, a sequence of microfilm frames may be rapidly exposed to data from tube 10 and business forms from projector 28.

Figure 2:
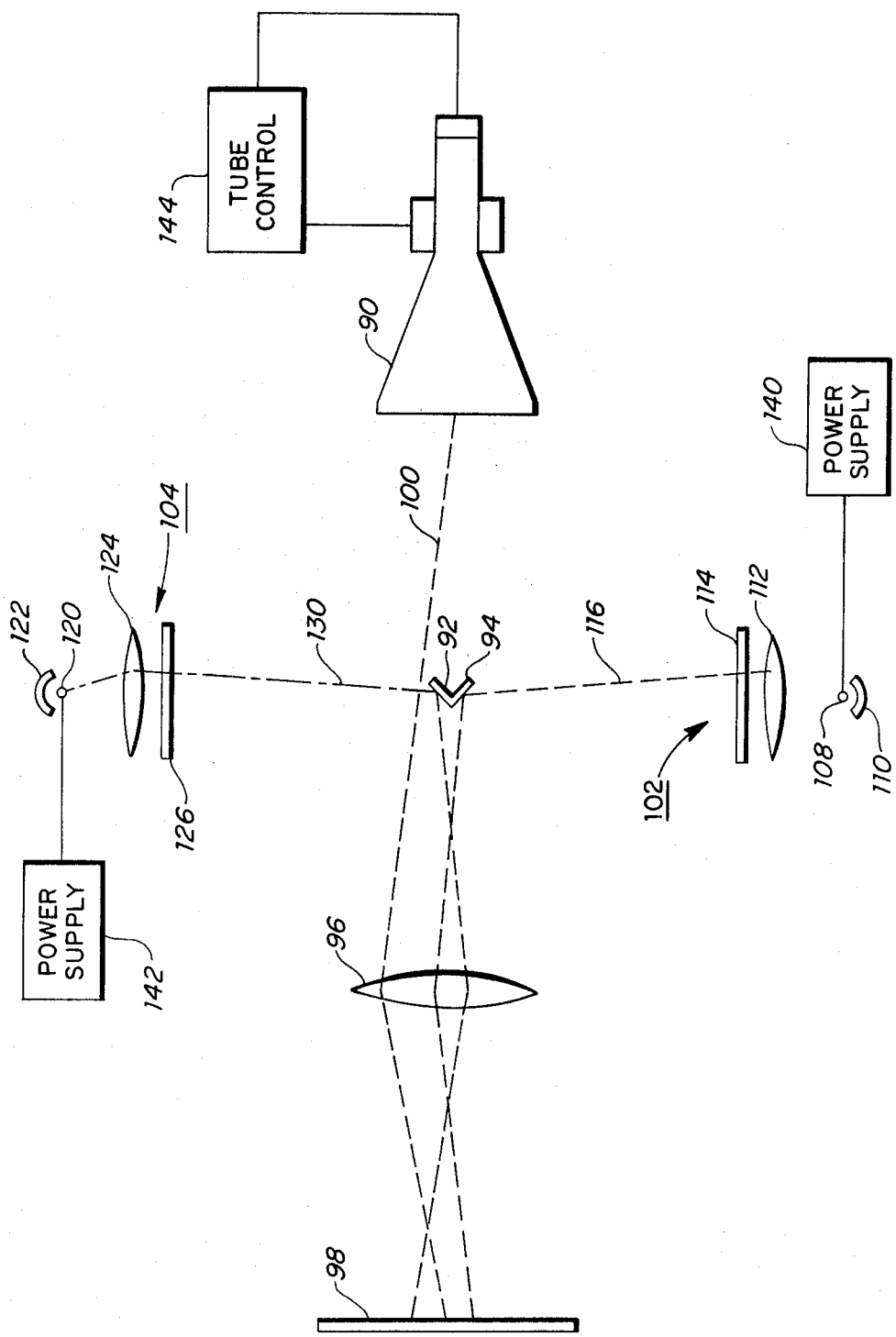
FIG. 2 shows a schematic representation of an alternative embodiment using more than two objects.

Another embodiment of the invention, using two directionally illuminated objects, is schematically shown in a display context in FIG. 2.

A diffusely illuminated object is produced on the face of tube 90 by tube control 114. Typically, the object may comprise alphanumerics, graphical information, radar data, etc. Light from this object passes around reflectors 92 and 94, and is imaged by lens 96 onto screen 98. The path of a typical light ray is shown at 100.

Two projection systems 102 and 104 provide directional sources to illuminate slides 114 and 126, the images of which are to be combined with the image from tube 90 on screen 98.

Projection system 102 includes a light source 108, reflector 110, lens 112, partially transparent slide 114 and small mirror 94. A typical light ray 116 is schematically illustrated to show the light path between light source 108 and screen 98.

The second projection system, 104, includes a light source 120, reflector 122, lens 124, partially transparent slide 126 and small mirror 92. The path of a typical light ray 130 is shown.

As discussed above, any suitable small mirrors may be used as mirrors 92 and 94. In this embodiment, mirrors 92 and 94 are slightly off of the optical axis between tube 90 and screen 98. However, optical distortions will be very minor since they are so close to this optical axis.

In operation, this system may typically be used in a military display system. For example, projector 102 might project an image of a map onto screen 98, while projector 104 projects a grid overlay pattern. Tube 90 could superimpose radar patterns, data, etc. Screen 98 may be a front or rear projection screen, as desired. Light sources 108 and 122 are activated when required by power supplies 140 and 142, respectively. Tube 90 is operated under the control of tube control unit 144, which may receive radar information or computer generated information, or keyboard entries.

While various components and arrangements have been described in the above description of preferred embodiments, other suitable arrangements or components may be used, where suitable, with similar results.

Other variations and modifications of the present invention will occur to those skilled in the art upon reading this disclosure. These are intended to be included within the scope of the invention, as defined in the appended claims.

I claim:
1. An image combining optical system comprising:
    a. a first diffusely illuminated object having a first light-and-shadow pattern thereon;
    b. a lens system positioned to pass light from said first object along an optical axis and to form an image of said pattern on an image plane;
    c. at least one substantially totally reflecting surface substantially on said axis at an angle thereto, said surface blocking only a portion of the light passing from said first object to said image plane; and
    d. at least one additional object, an optical projection system arranged to illuminate said additional object and to direct light against said reflecting surface, and through said lens system to said image plane whereby an image of said second object is superimposed on said image plane in registration with the image of said first object.

2. The optical system according to claim 1 wherein said first object comprises a cathode ray tube face, said at least one additional object and said optical projection system comprise a transparency projection system and said image plane includes a photosensitive surface.

3. The optical system according to claim 2 wherein said reflecting surface has a size just sufficient to reflect the significant portion of the zero order diffraction pattern of the transparency used in said transparency projection system.

4. An image combining optical system comprising:
    a. a first diffusely illuminated object having a first light-and-shadow pattern thereon;
    b. a lens system positioned to pass light from said first object along an optical axis and to form an image of said pattern on an image plane;
    c. first and second reflecting surfaces each positioned with one edge substantially on said axis, each at a different angle to said axis, said surfaces blocking only a portion of the light passing from said first object to said image plane; and
    d. a first optical projection system arranged to illuminate a second object and a second optical projection system arranged to illuminate a third object, said first and second projection systems positioned to direct light against said first and second reflecting surfaces, respectively; said second and third objects and said reflecting surfaces arranged so that said projected light passes from said reflecting surfaces through said lens system to said image plane, whereby images of said second and third objects are focused on said image plane in superimposed register with the image of said first object.

5. The optical system according to claim 4 wherein said first object comprises a cathode ray tube screen; said second and third objects and said projection systems comprises transparency projection systems and said image plane includes a photosensitive surface.

6. The optical system according to claim 5 wherein each of said first and second reflecting surfaces each has an area just sufficient to reflect the significant portion of the zero order diffraction pattern of the transparencies used in said transparency projection systems.

7. An image combining optical system comprising:
    a. a cathode ray tube system for producing a light-and-shadow pattern on the face thereof forming a diffusely illuminated object;
    b. a lens system positioned to pass light from said diffusely illuminated object along an optical axis and to form an image of said pattern on an image plane;
    c. at least one substantially totally reflecting surface located substantially on said axis at an angle thereto, said surface blocking only a portion of the light passing from said diffusely illuminated object to said image plane; and
    d. at least one transparency projection system for illuminating a partially-transparent light-and-shadow pattern, said illumination projected against said reflecting surface, said projection system and said reflecting surface arranged so that said projected light passes from said reflecting surface through said lens system to said image plane, whereby an image of said partially transparent pattern is formed on said image plane in superimposed register with the image of said diffusely illuminated pattern.

8. The optical system according to claim 7 wherein said reflecting surface has a size just sufficient to reflect the significant portion of the zero order diffraction pattern of the transparency used in said transparency projection station.

* * * * *